United States Patent
Choi et al.

(10) Patent No.: US 8,271,204 B2
(45) Date of Patent: Sep. 18, 2012

(54) HUMAN RECOGNITION APPARATUS AND HUMAN RECOGNITION METHOD

(75) Inventors: Seung Min Choi, Deajeon (KR); Ji Ho Chang, Daejeon (KR); Jae Il Cho, Daejeon (KR); Dae Hwan Hwang, Daejeon (KR); Jae Yeon Lee, Daejeon (KR); Do Hyung Kim, Daejeon (KR); Eul Gyoon Lim, Daejeon (KR); Ho Chul Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 728 days.

(21) Appl. No.: 12/362,992

(22) Filed: Jan. 30, 2009

(65) Prior Publication Data

US 2010/0070187 A1    Mar. 18, 2010

(30) Foreign Application Priority Data

Aug. 4, 2008   (KR) .................. 10-2008-0076098

(51) Int. Cl.
*G06F 19/00*   (2006.01)
(52) U.S. Cl. .......... 702/19; 702/141; 702/189; 345/475; 345/473
(58) Field of Classification Search .............. 702/19, 702/56, 141, 188, 189, 150, 149, 160; 345/115, 345/440, 420, 475, 473, 204, 174; 340/323 R, 340/384.71, 665, 853.2, 573.1, 539.11, 539.13, 340/531
See application file for complete search history.

(56) References Cited

U.S. PATENT DOCUMENTS

| | | | | |
|---|---|---|---|---|
| 5,483,630 | A | * | 1/1996 | Unuma et al. ............ 345/475 |
| 6,571,193 | B1 | * | 5/2003 | Unuma et al. ............ 702/141 |
| 6,941,239 | B2 | * | 9/2005 | Unuma et al. ............ 702/141 |
| 2002/0024512 | A1 | * | 2/2002 | Terasawa et al. ......... 345/204 |
| 2003/0208335 | A1 | * | 11/2003 | Unuma et al. ............ 702/141 |
| 2008/0281220 | A1 | * | 11/2008 | Sharifpour ............... 600/538 |

FOREIGN PATENT DOCUMENTS

| | | | |
|---|---|---|---|
| JP | 2001-190527 | | 7/2001 |
| JP | 2001190527 | A * | 7/2001 |
| JP | 2004046662 | A * | 2/2004 |
| JP | 2004-147793 | | 5/2004 |
| JP | 2004147793 | A * | 5/2004 |
| KR | 10-2008-0050042 | | 6/2008 |

OTHER PUBLICATIONS

Korean Office Action issued Jul. 27, 2010 in corresponding Korean Patent Application 10-2008-0076098.

* cited by examiner

*Primary Examiner* — Carol Tsai
(74) *Attorney, Agent, or Firm* — Staas & Halsey LLP (57) ABSTRACT

Provided are a human recognition apparatus and a human recognition method identifying a user based on a walking pattern. The human recognition apparatus includes a detecting unit detecting a vibration according to a user's walking, and outputting an electric signal, a pattern calculating unit acquiring a walker's walking pattern from the electric signal, and a user determining unit comparing the walking pattern with a previously measured reference data by user and identifying the user based on the comparison result. The human recognition apparatus and the human recognition method are robust against peripheral noise and can increase an acceptance rate through a simple structure and procedure by using the waling pattern, which is one-dimensional time information requiring no vast data throughput, as the user identification data.

14 Claims, 4 Drawing Sheets

HUMAN RECOGNITION APPARATUS AND HUMAN RECOGNITION METHOD

CROSS-REFERENCE TO RELATED APPLICATIONS

This application claims priority under 35 U.S.C. §119 to Korean Patent Application No. 10-2008-0076098, filed on Aug. 4, 2008, the disclosure of which is incorporated herein by reference in its entirety.

TECHNICAL FIELD

The present disclosure relates to a human recognition apparatus and a human recognition method, and in particular, to a human recognition apparatus and a human recognition method which are capable of acquiring a user's walking patterns by using a vibration sensor and identifying a user according to the acquired walking patterns.

BACKGROUND

In recent years, studies have been conducted on intelligent robots interacting with human, as opposed to robots performing a repetitive task in industrial fields. Human-Robot Interaction (HRI) technology is applied to the intelligent robots interacting with human.

HRI technology is a technology that implements an interface system for interaction and communication between human and robot. HRI technology has been researched and developed based on human recognition technology (or biometric recognition technology).

Human recognition technology is a technology that recognizes or identifies a user by using a user's face, iris, retina, fingerprint, cloth, physical appearance, voice, and signature, and its application range is getting wider in security, human identification, and identity verification.

A related art human recognition has been performed on the basic premise of user's cooperation. For example, in the case of the face recognition, the user is required to impassively stare a camera at a specific distance for several seconds, or approach his or her iris to a camera, or carefully contact his or her fingerprint to a fingerprint reader.

However, in various fields including robot's HRI field, there is an increasing need to recognize users even though they are uncooperative. That is, there is an increasing need to recognize the user by using semi biometric information such as height, face or cloth's color, which can be acquired without user's cooperation, instead of biometric information such as iris or fingerprint, which requires user's cooperation.

The human recognition using the semi biometric information is considered to allow an error to some degree and perform a minimum recognition in a corresponding application, even though the user is uncooperative in an actual everyday life environment. However, since the related art human recognition technology is greatly affected by variation of illumination, color sensitivity of a camera, angle of view, noise of a microphone, noise generated during the processing of image information and voice information, and throughput of vast data, there is a limitation in increasing an acceptance rate by using the semi biometric information, and an acceptance range is narrow and an accuracy does not reach a desired level. For example, the existing human recognition technology can merely distinguish persons in a limited identification environment (for example, less than ten persons in doors), and it has not yet been commercialized.

SUMMARY

Accordingly, the present disclosure provides a human recognition apparatus and a human recognition method which are less affected by surroundings, proposes new semi biometric information, and identifies users at high accuracy by using the new semi biometric information.

According to an aspect, there is provided a human recognition apparatus, including: a detecting unit detecting a vibration according to a user's walking, and outputting an electric signal; a pattern calculating unit acquiring a walker's walking pattern from the electric signal; and a user determining unit comparing the walking pattern with a previously measured reference data by user and identifying the user based on the comparison result.

The detecting unit may detect a vibration waveform of the ground generated when the user's feet land on the ground and convert the detected vibration waveform into the electric signal. Furthermore, the pattern calculating unit may analyze the electric signal to calculate the user's walking pattern, and output the calculated walking pattern as identification data. The user determining unit may compare the identification data with a previously measured user data and identify the user based on the comparison result.

According to another aspect, there is provided a human recognition method, including: detecting a vibration according to a user's walking, and converting the detected vibration into an electric signal; calculating a walker's walking pattern according to the electric signal; and comparing the calculated walking pattern with a previously measured reference data by user and identifying the user based on the comparison result.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, it will be assumed that a human recognition apparatus according to an exemplary embodiment is mounted on a robot, but the human recognition apparatus is not limited thereto. The human recognition apparatus can be used in various industrial technologies requiring the user identification.

To improve the understanding of the specification, technologies that are well known in the art which the present invention pertains and are not directly related to the present invention will be omitted. The term "user" used herein throughout the specification including claims refers to a user who directly uses an apparatus (for example, a robot) mounted with the human recognition apparatus of the present invention, and all users the apparatus intends to identify in a monitoring area.

Hereinafter, the exemplary embodiments will be described in detail with reference with the accompanying drawings.

Figure 1:
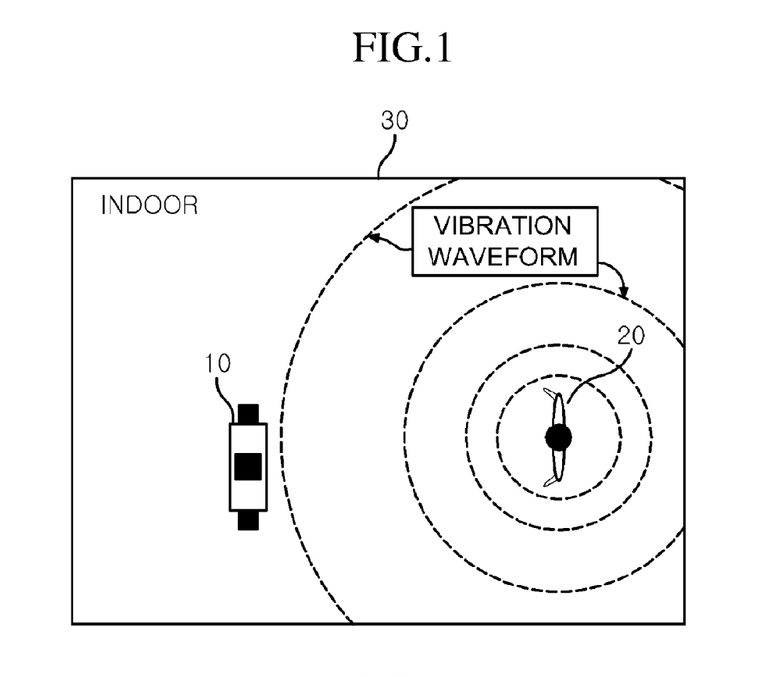
FIG. 1 is a diagram for explaining a virtual situation in which a robot mounted with a human recognition apparatus according to an exemplary embodiment identifies a user.

FIG. 1 is a diagram for explaining a virtual situation in which a robot mounted with a human recognition apparatus according to an exemplary embodiment identifies a user.

It is assumed that a robot 10 of FIG. 1 is a self-propelled robot required to identify users 20 who live in a general home or office environment 30.

If the human recognition apparatus and the human recognition method according to an exemplary embodiment are applied in such a circumstance, when the users 20 walk around a location where the robot 10 is placed within a monitoring area 30, the human recognition apparatus mounted on the robot 10 detects a vibration caused by the walking activity, checks a walking pattern, and uses the walking pattern as identification data to determine if the walker is a member. If it is determined that the walker is the member, the human recognition apparatus recognizes who is the walker, and makes the robot perform a specific operation according to the result.

The human recognition apparatus according to the exemplary embodiment will be described below in more detail with reference to FIGS. 2 to 5.

Figure 2:
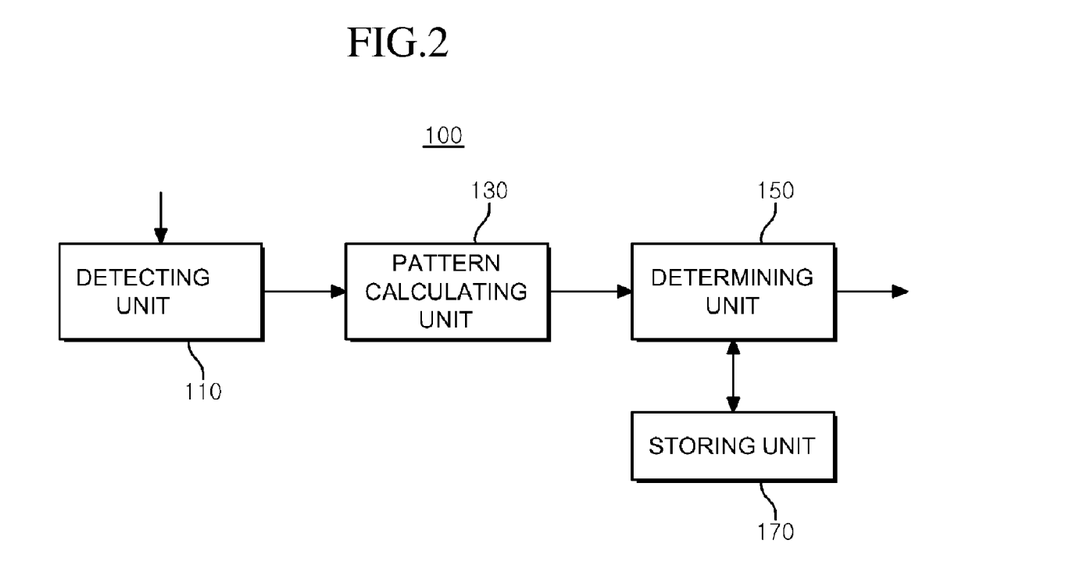
FIG. 2 is a block diagram illustrating a structure of a human recognition apparatus according to an exemplary embodiment.
Figure 3:
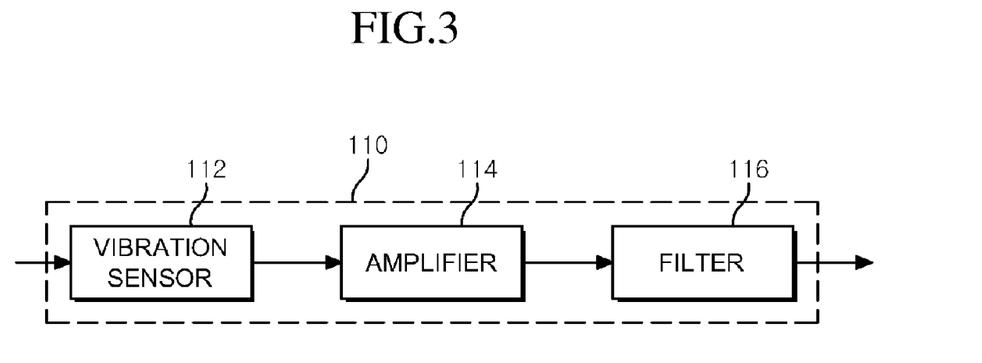
FIG. 3 is a block diagram illustrating an internal structure of a detecting unit of FIG. 2.
Figure 4:
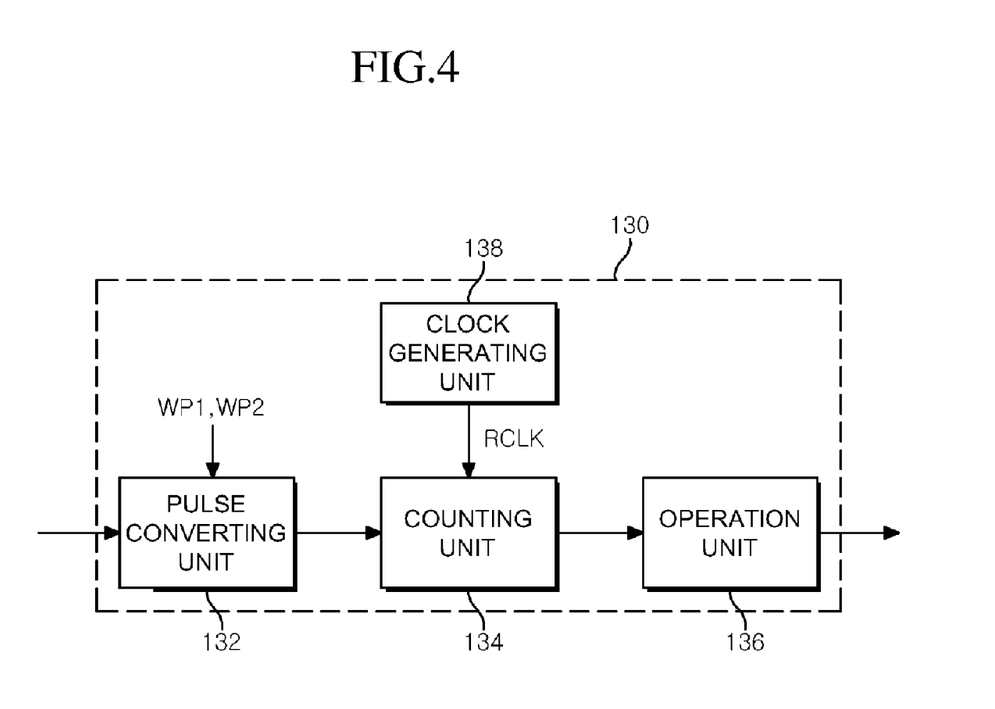
FIG. 4 is a block diagram illustrating an internal structure of a pattern calculating unit of FIG. 2.
Figure 5:
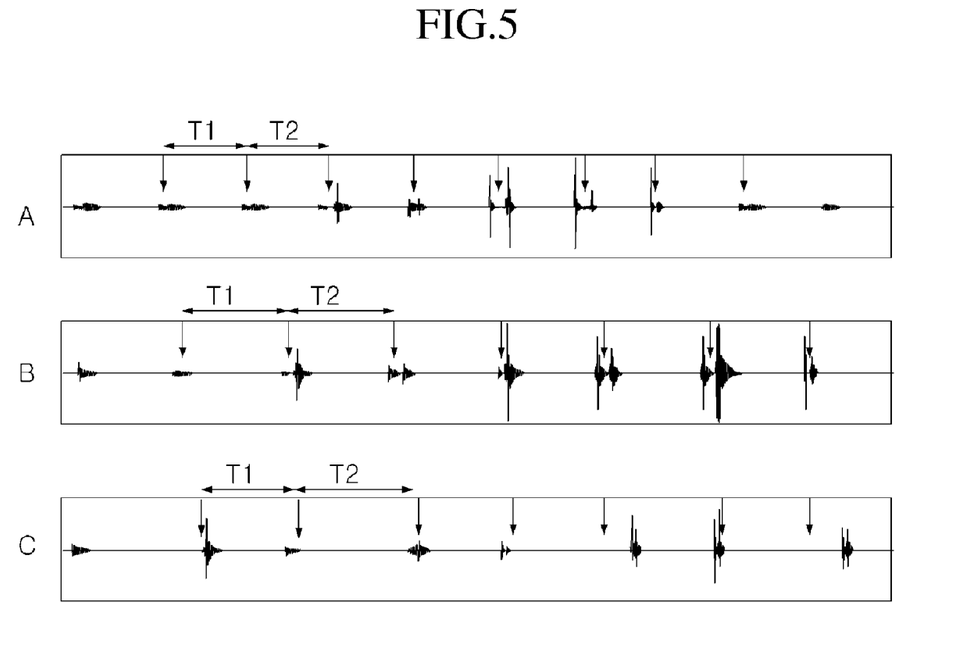
FIG. 5 is a waveform diagram of electric signals output from the detecting unit according to the walking.

FIG. 2 is a block diagram schematically illustrating a structure of a human recognition apparatus according to an exemplary embodiment, FIG. 3 is a block diagram illustrating an internal structure of a detecting unit 110 of FIG. 2, FIG. 4 is a block diagram illustrating an internal structure of a pattern calculating unit 130 of FIG. 2, and FIG. 5 is a waveform diagram of electric signals output from the detecting unit 110 according to the walking.

The human recognition apparatus 100 according to the exemplary embodiment includes a detecting unit 110, a pattern calculating unit 130, a determining unit 150, and a storing unit 170.

The detecting unit 110 detects a ground vibration periodically transferred through a ground when the user walks, and converts the detected ground vibration into an electric signal.

As illustrated in FIG. 3, the detecting unit 110 may include a vibration sensor 112, an amplifier 114, and a filter 116.

The vibration sensor 112 detects a ground vibration and converts the detected ground vibration into an electric signal which is proportional to a physical magnitude of the vibration.

Any sensor can be used as the vibration sensor 112 only if it has enough sensitivity to detect the ground vibration according to the user's walking within a required detection area, without limitation in it detailed structure or kinds. Since various kinds of vibration sensors are known, further detailed description thereof will be omitted.

The vibration sensor 112 detects the vibration generated by the user's walking and outputs an electric signal as illustrated in FIG. 5. The electric signal has a first peak WP1 and a second peak WP2.

The first peak WP1 is a peak generated at the time when one foot of the user (for example, the user's right foot) lands on the ground, and the second peak WP2 is a peak generated at the time when the other foot of the user (for example, the user's left foot) lands on the ground.

That is, the vibration sensor 112 outputs an electric signal in which a plurality of first peaks WP1 and a plurality of second peaks WP2 are alternately generated according to the user's walking.

The amplifier 114 amplifies the magnitude of the electric signal output from the vibration sensor 112. When the magnitude of the electric signal output from the vibration sensor 112 is weak, it is amplified by the amplifier 114. However, if the magnitude of the output signal of the vibration sensor 112 is sufficiently large for a subsequent processing, the amplifier 114 may be omitted. The amplifier 114 may be implemented with a voltage amplifier or a charge amplifier.

The filter 116 removes noise of low frequency components contained in the amplified electric signal. To this end, the filter 116 may be implemented with a high pass filter which passes only high frequency components higher than a cut-off frequency and eliminates low frequency components.

That is, the filter 116 outputs an electric signal from which a vibration of the robot 10 itself or a fine vibration component generated in everyday life is removed, thereby improving the accuracy of a following identification process.

The pattern calculating unit 130 receives the electric signal, which has the unique pattern according to the user's walking, from the detecting unit 110, calculates a pattern value corresponding to the user's walking (hereinafter, referred to as a walking pattern) by using the received electric signal, and provides the calculated walking pattern to the determining unit 150 as the user identification data.

Specifically, the pattern calculating unit 130 detects a plurality of first peaks WP1, which are generated whenever one foot of the user (for example, the user's right food) lands on the ground, and a plurality of second peaks WP2, which are generated whenever the other foot of the user (for example, the user's left foot) lands on the ground, from the electric signal transferred from the detecting unit 110. Thereafter, the pattern calculating unit 130 selects at least three successive peaks from the detected first and second peaks WP1 and WP2, and calculates a first time T1 between the first peak and the second peak, and a second time T2 between the second peak and the next first peak. Then, the pattern calculating unit 130 calculates a ratio (T2/T1) of the first time T1 to the second time T2, and transfers the calculated ratio (T2/T1) to the determining unit 150 as the user's walking pattern. The walking pattern is used as user identification data by the determining unit 150.

The pattern calculating unit 130 may include a sampling unit detecting the peaks of the input electric signal and their time intervals, a selecting unit selecting at least three successive peaks from the detected peaks to calculate at least two time intervals of the selected peaks, and an operation unit calculating a ratio of the at least two time intervals. Since the sampling unit, the selecting unit, and the operation unit have only to perform relatively simple operations, they can be easily implemented using simple analog circuits. Therefore, the error probability due to noise can be reduced and the implementation cost can be reduced.

As illustrated in FIG. 4, the pattern calculating unit 130 may be implemented to perform a digital operation. That is, as another exemplary implementation, the pattern calculating unit 130 includes a pulse converting unit 132, a counting unit 134, an operation unit 136, and a clock generating unit 138.

The pulse converting unit 132 converts the electric signal into a pulse when the peak higher than a certain level is detected in the analog electric signal output from the detecting unit 110. To this end, the pulse converting unit 132 may be implemented with a variety of pulse conversion circuits which can convert analog signals into pulses. For example, the pulse converting unit 132 may be implemented with pulse conversion circuits such as a clipping circuit, a clamping circuit, a limiter circuit, a slicer circuit, and a pulse width modulation circuit.

The converted pulses output from the pulse converting unit 132 include a first pulse, which is generated when one foot of the user (for example, the user's right food) lands on the ground, and a second pulse, which is generated when the other foot of the user (for example, the user's left foot) lands on the ground. The first pulse and the second pulse correspond to the first peak and the second peak, respectively.

The counting unit 134 counts a time interval between the first pulse and the second pulse and a time interval between the second pulse and the next first pulse, which are output from the pulse converting unit 132, by using a reference clock provided from the clock generating unit 138, and outputs a first count value and a second count value, respectively. In this case, the first and second count values output from the counting unit 134 may be data bits of several bits or more.

The operation unit 136 calculates the walking pattern by using the first and second count values output from the counting unit 134. Specifically, the operation unit 134 divides the second count value by the first count value, and outputs the resulting value as a pattern value of a vibration period. For example, if the first count value is 4 clk and the second count value is 5 clk, the operating unit 136 outputs 1.25 as the pattern value. The operation unit 136 provides the calculated pattern value to the determining unit 150 as the user identification data.

In this way, when the pattern calculating unit is implemented in view of the digital circuit, it can be implemented using the digital circuit which has already been provided in the robot 10 where the human recognition apparatus according to the exemplary embodiment is mounted or implemented.

That is, the determining unit 130 can be implemented by reusing the pulse converting unit, the clock generating unit, the counting unit, and the processor which are basically mounted on several automatic equipments.

The way the walking pattern obtained by the pattern calculating unit 130 is used as the user identification data will be described below in detail with reference to FIG. 5.

FIG. 5 is a waveform diagram of the electric signals generated according to the user's walking, that is, the signals output from the detecting unit 110.

In FIG. 5, a solid-line arrow represents the time when one foot of the user (for example, the user's right foot) lands on the ground, and a dotted-line arrow represents the time when the other foot of the user (for example, the user's left foot) lands on the ground. As described above, the first time T1 represents the time taken until the other foot of the user (the user's left foot) lands on the ground after one foot of the user (the user's right foot) lands on the ground, and the second time T2 represents the time taken until one foot of the user (the user's right foot) again lands on the ground after the first time T1.

Meanwhile, three electric signals A, B and C are electric signals generated when the same user walks at different speeds or when different users walk.

The first signal A and the second signal B are signals generated when the same user (user 1) walks at different speeds. That is, the first vibration signal A is a signal generated when the user 1 moves at a first walking speed, and the second vibration signal B is a signal generated when the user 1 moves at a second walking speed lower than the first walking speed.

The third signal C is a signal generated when another user (user 2) moves at a random walking speed.

Table 1 below shows the walking patterns calculated with respect to the electric signals A, B and C in the above-described manner by the pattern calculating unit 130.

TABLE 1

|  | T1 | T2 | T2/T1 |
|---|---|---|---|
| Signal A (User 1 moves at the first walking speed) | 1.98 | 2.18 | 1.10 |
| Signal B (User 1 moves at the first walking speed) | 2.58 | 2.78 | 1.08 |
| Signal C (User 2) | 2.38 | 2.98 | 1.25 |

Referring to Table 1 above, the first time (T1) and the second time (T2) of the first signal A are shorter than the first time (T1) and the second time (T2) of the second signal B. This is because the user 1's walking speed generating the first signal A is faster than the user 1's walking speed generating the second signal B. However, as shown in Table 1 above, the walking pattern (T2/T1) of the first signal A has a value almost similar to that of the walking pattern (T2/T1) of the second signal B. That is, even though the user 1 moves at different walking speeds, the difference of the walking pattern (T2/T1) is small. On the other hand, as shown in Table 1 above, the user 2's walking pattern (T2/T1) is quite different from the user 1's pattern (T2/T1) of the vibration period.

Consequently, the users have their own inherent walking characteristics. Therefore, it can be seen from Table 1 above that the vibration period of the ground generated during the user's walking can be used as the users' unique identification information.

Meanwhile, the peak in the electric signals according to the vibration during the walking is generally divided into a first component and a second component. That is, as illustrated in FIG. 5, the first peak WP1 according to one foot's landing and the second peak WP2 according to the other foot's landing respectively contain two peak components.

This is because, during the person's normal walking, the heel first lands on the ground and immediately the whole sole of the foot or a front portion thereof lands on the ground.

Therefore, a criterion for determining the generation time points of the first peak WP1 and the second peak WP2 is needed. In this exemplary embodiment, as illustrated in FIG. 5, the middle of the generation time points of the first component and the second component of each peak is defined as the peak generation time point. However, it is apparent that the generation time point of the first peak or the generation time point of the second peak can also be defined as the peak generation time point. That is, the peak generation time point may be defined with highest recognition accuracy through a basic experiment according to the environment where the present invention is applied.

The determining unit 150 identifies the uses entering the monitoring area by using the walking pattern transferred from the pattern calculating unit 130 as the identification data. Specifically, the determining unit 150 compares the identification data transferred from the pattern calculating unit 130 with at least one reference data and determines whether the identification data is identical or similar to the reference data.

The reference data is the walking pattern corresponding to the walking activity of the user to be identified, which has been previously measured. The reference data may be a mean value of the walking patterns measured several times.

If the reference data identical to the identification data or similar thereto within a certain range (that is, similar above a preset threshold value) is searched, the determining unit 150 determines that the user entering in the monitoring area is a member, and outputs the determination result. The output determination result may be used as information for control the operation of the robot 10, and may be displayed on a display device of the robot 10 or reported to a remote manager through a wired/wireless communication scheme.

If the reference data identical to the identification data or similar thereto within a certain range is not searched, the determining unit 150 determines that the user entering in the monitoring area is not a member, and controls the operation of the robot 10 (for example, generates a warning sound or hinders the access) or reports the determination result to a system manager through a wired/wireless communication scheme.

The determining unit 150 may be implemented relatively simply by using a subtractor, a comparator, and an operation unit.

That is, the subtractor subtracts the walking pattern from at least one reference data of each user and outputs an absolute value. The comparator calculates the identity or similarity between the calculated walking pattern and the reference data of each user, and outputs a true value when the lowest absolute value among the outputs of the subtractor is less than the preset threshold value, and checks if the calculated walking pattern is the member or the recognition is correctly performed. When the output of the comparator is a true value, the operator selects the reference data of the user where the lowest absolute value is calculated, and extracts the corresponding user information. In this way, it can be distinguished who the user is.

On the other hand, it is apparent that the above-described operations can be implemented in software by using the processor which is basically mounted on the robot 10.

Figure 6:
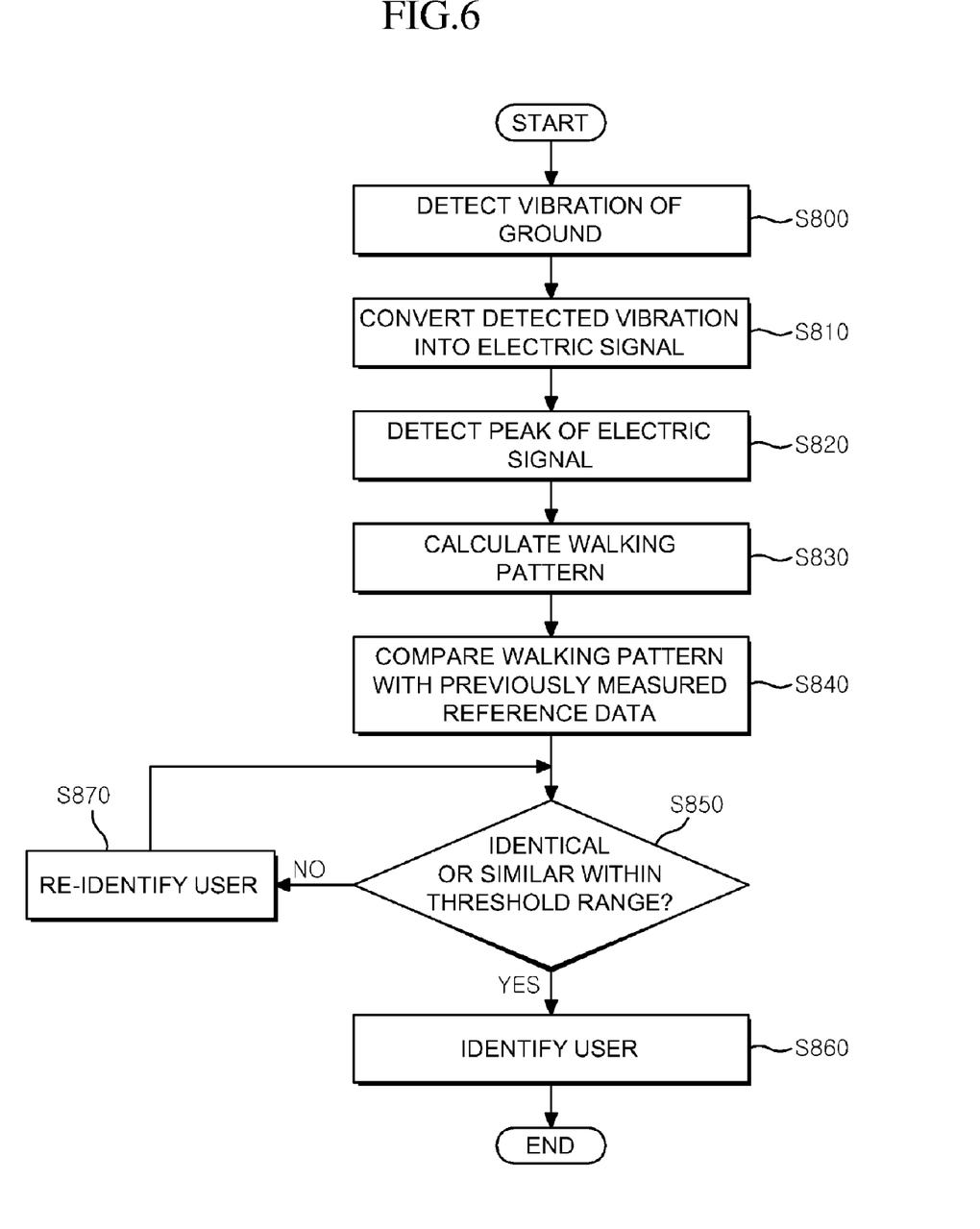
FIG. 6 is a flowchart illustrating a human recognition method using a vibration waveform detection according to an exemplary embodiment.

FIG. 6 is a flowchart illustrating a human recognition method using a vibration waveform detection according to an exemplary embodiment.

In step S800, the vibration sensor 112 of the detecting unit 110 detects a vibration waveform of the ground which is generated by the user's walking. The detected vibration waveform includes a first vibration waveform generated when the user's right foot lands on the ground, and a second vibration waveform generated when the user's left foot lands on the ground.

In step S810, the detected vibration waveform is converted into an electric signal through the amplifier 114 and/or the filter 116. The electric signal includes a first peak generated when one foot of the user (for example, the user's right foot) lands on the ground, and a second peak generated when the other foot of the user (the user's left foot) lands on the ground.

In steps S820 and S830, the pattern calculating unit 130 detects the first and second peaks contained in the electric signal, and calculates a walking pattern. That is, the pattern calculating unit 130 randomly selects at least three successive peaks (for example, the first peak, the second peak, and the next first peak), and calculates a ratio of a second time (T2) to a first time (T1) by dividing the second time, which is defined by a time interval between the second peak and the next first peak, by the first time, which is defined by a time interval between the first peak and the second peak, and then outputs the ratio of T2/T1 as the walking pattern.

In this case, although the walking pattern can be calculated by only three successive peaks, the pattern calculating unit 130 may select more peaks, calculate a plurality of ratios (T2/T1), and calculate their mean value as a walking pattern in order to prevent a false recognition caused because the user does not walk in a normal walking way for any reason at the time of the user recognition, or a false recognition caused by interference due to peripheral noise.

In step S840, the calculated walking pattern is compared with at least one reference data which is previously measured and stored. The reference data is a walking pattern value corresponding to at least one walling activity of the user to be identified. The reference data may be a mean value of walking pattern values measured several times.

In steps S850 and S860, if the user information having a reference pattern identical to the calculated walking pattern or similar thereto within a certain range is searched from a database, the person corresponding to the calculated walking pattern is determined as a member, and who is the person is identified. The human recognition method may further include controlling the operation of the robot 10 according to the identification result or reporting the identification result to the manager through a wired/wireless communication scheme.

If the reference data having the reference mean value identical or similar to the calculated pattern is not searched, the person corresponding to the walking pattern is determined as non-member.

However, in the actual application, there may occur a case where the person who is a member is considered as a non-member when the reference data identical or similar within a certain range is not searched due to a false recognition.

To prevent such a case, if the walking pattern is determined as not being identical to the reference data or similar thereto within a certain range in step S850, a re-identification procedure may be further performed in order for verification in step S870.

Prior to the re-identification procedure, after a section different from the section where the walking pattern is calculated is selected from the electric signal, the above-described steps S820 to S840 may be performed on the selected new section.

On the other hand, the above-described steps S820 to S840 may be again performed on the new section contained in the electric signal by calculating a mean value of the previously calculated walking pattern and the newly calculated walking pattern and then comparing the calculated mean value with the reference data.

The former case can effectively prevent a false recognition when the user momentarily moves in a pattern different from his or her normal walking. The latter case can efficiently prevent a false recognition caused by peripheral noise.

A variety of re-identification methods can be derived without departing from the technical spirit and scope of the present invention. It is preferable that the re-identification method should be selected, considering the walking characteristics of persons to be recognized by the recognition apparatus (for example, children in kindergarten, adults in offices, and so on)

According to the above-described exemplary embodiments, the user can be identified by detecting the vibration periods generated when the user walks. Since the vibration periods are one-dimensional information, the user can be identified by a relatively simple structure and operation.

In addition, since the one-dimensional time information has only to be stored, the reference data of the users to be identified can be stored and managed in a small storage area.

Furthermore, since the user's walking pattern is very regular, a noise filtering is easy, thereby providing a very strong resistance to noise.

Moreover, noise and operation error due to vast data throughput can be prevented, thereby improving the acceptance rate.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A human recognition apparatus, comprising:
a detecting unit, located at a distance from a user, detecting a ground vibration according to a user's walking, and outputting an electric signal;
a pattern calculating unit acquiring a walker's walking pattern from the electric signal; and
a user determining unit comparing the walking pattern with a previously measured reference data by user and identifying the user based on the comparison result,
wherein the detecting unit comprises:
a vibration sensor outputting an electric signal corresponding to peripheral vibration; and
a high pass filter eliminating a low frequency noise from the electric signal.

2. The human recognition apparatus of claim 1, further comprising a storing unit storing the previously measured reference data by user.

3. A human recognition apparatus, comprising:
a detecting unit detecting a vibration according to a user's walking, and outputting an electric signal;
a pattern calculating unit acquiring a walker's walking pattern from the electric signal; and
a user determining unit comparing the walking pattern with a previously measured reference data by user and identifying the user based on the comparison result,
wherein the detecting unit comprises:
a vibration sensor outputting an electric signal corresponding to peripheral vibration; and
a high pass filter eliminating a low frequency noise from the electric signal,
wherein the pattern calculating unit outputs a ratio of a time interval between a second vibration signal and a next first vibration signal to a time interval between a first vibration signal and the second vibration signal as the user's walking pattern, where the first vibration signal is generated when one foot of the user lands on the ground, and the second vibration signal is generated when the other foot of the user lands on the ground.

4. The human recognition apparatus of claim 3, wherein the pattern calculating unit comprises:
a pulse converting unit converting the first vibration signal into a first pulse, and converting the second vibration signal into a second pulse;
a counting unit counting a period of the first pulse to output a first count value, and counting a period of the second pulse to output a second count value; and
an operation unit dividing the second count value by the first count value.

5. A human recognition apparatus, comprising:
a detecting unit detecting a vibration according to a user's walking, and outputting an electric signal;
a pattern calculating unit acquiring a walker's walking pattern from the electric signal; and
a user determining unit comparing the walking pattern with a previously measured reference data by user and identifying the user based on the comparison result,
wherein the detecting unit comprises:
a vibration sensor outputting an electric signal corresponding to peripheral vibration; and
a high pass filter eliminating a low frequency noise from the electric signal,
wherein the pattern calculating unit comprises:
a sampling unit detecting peaks of the electric signal;
a selecting unit selecting at least three successive peaks from the detected peaks, and calculating at least two time intervals between the selected peaks; and
an operation unit calculating a ratio of the at least two time intervals.

6. A human recognition apparatus, comprising:
a detecting unit detecting a vibration according to a user's walking, and outputting an electric signal;
a pattern calculating unit acquiring a walker's walking pattern from the electric signal; and
a user determining unit comparing the walking pattern with a previously measured reference data by user and identifying the user based on the comparison result,
wherein the detecting unit comprises:
a vibration sensor outputting an electric signal corresponding to peripheral vibration; and
a high pass filter eliminating a low frequency noise from the electric signal,
wherein the user determining unit comprises:
a comparing unit calculating similarity between the walking pattern and the at least one reference data; and
a selecting unit selecting a reference data having the highest similarity and extracting user information corresponding to the selected reference data.

7. The human recognition apparatus of claim 6, wherein the user determining unit further comprises a verifying unit comparing the similarity with a preset threshold value and outputting an identification failure signal when the similarity is less than the preset threshold value.

8. A human recognition apparatus, comprising:
a detecting unit detecting a vibration according to a user's walking, and outputting an electric signal;
a pattern calculating unit acquiring a walker's walking pattern from the electric signal; and
a user determining unit comparing the walking pattern with a previously measured reference data by user and identifying the user based on the comparison result,
wherein the detecting unit comprises:
a vibration sensor outputting an electric signal corresponding to peripheral vibration; and
a high pass filter eliminating a low frequency noise from the electric signal,
wherein the user determining unit comprises:
a subtractor subtracting the walking pattern and the at least one reference data to output an absolute value of the resulting value;
a comparator outputting a true value when the lowest absolute value of the output of the subtractor is less than a preset threshold value; and
an operator selecting the reference data where the lowest absolute value is calculated, when the output of the comparator is a true value.

9. A human recognition method, comprising:
detecting, from a distance, a ground vibration according to a user's walking, and converting the detected vibration into an electric signal;
calculating a walker's walking pattern according to the electric signal; and
comparing the calculated walking pattern with a previously measured reference data by user and identifying the user based on the comparison result,
wherein the detecting comprises:
outputting an electric signal corresponding to peripheral vibration; and eliminating a low frequency noise from the electric signal with a high pass filter.

10. A human recognition method, comprising:
   detecting a vibration according to a user's walking, and converting the detected vibration into an electric signal;
   calculating a walker's walking pattern according to the electric signal; and
   comparing the calculated walking pattern with a previously measured reference data by user and identifying the user based on the comparison result,
   wherein the detecting comprises:
   outputting an electric signal corresponding to peripheral vibration; and
   eliminating a low frequency noise from the electric signal with a high pass filter,
   wherein the calculating of the walking pattern comprises:
   detecting a first vibration signal generated when one foot of the user lands on the ground;
   detecting a second vibration signal subsequent to the first vibration signal and generated when the other foot of the user lands on the ground;
   detecting the first vibration signal subsequent to the second vibration signal; and
   calculating a ratio of a second time interval between the second vibration signal and the next first vibration signal to a first time interval between the first vibration signal and the second vibration signal.

11. A human recognition method, comprising:
   detecting a vibration according to a user's walking, and converting the detected vibration into an electric signal;
   calculating a walker's walking pattern according to the electric signal; and
   comparing the calculated walking pattern with a previously measured reference data by user and identifying the user based on the comparison result,
   wherein the detecting comprises:
   outputting an electric signal corresponding to peripheral vibration; and
   eliminating a low frequency noise from the electric signal with a high pass filter,
   wherein the identifying of the user comprises:
   calculating at least one similarity by comparing the walking pattern with the at least one reference data;
   selecting the reference data corresponding to the highest similarity among the at least one similarity; and
   extracting user information corresponding to the selected reference data, and outputting the extracted user information as a walking user.

12. The human recognition method of claim 11, further comprising verifying if a highest similarity is greater than a preset threshold value.

13. The human recognition method of claim 12, further comprising performing the calculating of the walking pattern and the identifying of the user on another section of the electric signal when the highest similarity is less than the preset threshold value.

14. The human recognition method of claim 12, further comprising:
   calculating at least one new walling pattern when the highest similarity is less than the preset threshold value, and calculating a mean value of the previous walking pattern and the new walking pattern; and
   identifying the user by using the mean value.

* * * * *